United States Patent
Li et al.

(10) Patent No.: US 9,354,652 B2
(45) Date of Patent: May 31, 2016

(54) MAXIMUM POWER POINT TRACKING METHOD AND DEVICE, AND PHOTOVOLTAIC POWER GENERATION SYSTEM

(71) Applicants: BOE TECHNOLOGY GROUP CO., LTD., Beijing (CN); BEIJING BOE ENERGY TECHNOLOGY CO., LTD., Beijing (CN)

(72) Inventors: Jin Li, Beijing (CN); Xiaoyan Han, Beijing (CN); Ping Zheng, Beijing (CN); Jia He, Beijing (CN)

(73) Assignees: BOE TECHNOLOGY GROUP CO., LTD., Beijing (CN); BEIJING BOE ENERGY TECHNOLOGY CO., LTD., Beijing (CN)

( * ) Notice: Subject to any disclaimer, the term of this patent is extended or adjusted under 35 U.S.C. 154(b) by 29 days.

(21) Appl. No.: 14/597,460

(22) Filed: Jan. 15, 2015

(65) Prior Publication Data
US 2015/0370278 A1 Dec. 24, 2015

(30) Foreign Application Priority Data
Jun. 20, 2014 (CN) .......................... 2014 1 0283241

(51) Int. Cl.
*G05F 1/67* (2006.01)
*G05F 1/46* (2006.01)

(52) U.S. Cl.
CPC .. *G05F 1/67* (2013.01); *G05F 1/46* (2013.01); *Y02E 10/58* (2013.01)

(58) Field of Classification Search
CPC ............... G05F 1/67; G05F 1/46; G05F 3/08; G05F 5/00; Y02E 10/58; Y02E 10/563; H02J 3/383; H02J 3/385; H02J 7/35; Y10S 323/906
See application file for complete search history.

(56) References Cited

U.S. PATENT DOCUMENTS

| | | | | |
|---|---|---|---|---|
| 2010/0117623 | A1* | 5/2010 | Fife | G05F 1/67 324/76.11 |
| 2010/0145533 | A1* | 6/2010 | Cardinal | H02J 3/383 700/291 |
| 2011/0261593 | A1 | 10/2011 | Pan | |
| 2012/0235484 | A1* | 9/2012 | Yamada | H02J 3/32 307/43 |
| 2013/0342017 | A1* | 12/2013 | Lipan | G05F 1/67 307/43 |
| 2015/0155818 | A1* | 6/2015 | Itako | G05F 1/67 700/287 |

FOREIGN PATENT DOCUMENTS

| | | |
|---|---|---|
| CN | 101604848 A | 12/2009 |
| CN | 102331808 A | 1/2012 |
| CN | 202384776 U | 8/2012 |
| CN | 102780232 A | 11/2012 |
| JP | 62-298815 A | 12/1987 |

OTHER PUBLICATIONS

Chinese Office Action dated Apr. 24, 2015 issued in Chinese Application No. 201410283241.1.
Jin Li, "Research on High-power PV grid-connected inverter Control Strategy", China excellent dissertations full-text database, Engineering Technology, vol. 2, pp. 1-87.

* cited by examiner

*Primary Examiner* — Adolf Berhane
*Assistant Examiner* — Henry Lee, III
(74) *Attorney, Agent, or Firm* — Nath, Goldberg & Meyer; Joshua B. Goldberg; Christopher Thomas

(57) ABSTRACT

A maximum power point tracking method, device and a photovoltaic power generation system. The maximum power point tracking method involves sampling a present voltage and a present current of a photovoltaic array and obtaining a present power based on the present voltage and the present current. The maximum power point tracking using a difference between the present power and a power for a previous sampling time as a present perturbation power, and based on a ratio of the present perturbation power to a perturbation power for a previous sampling time obtain a gradient perturbation voltage step ratio. Further, the maximum power point tracking obtains a perturbation voltage step based on the gradient perturbation voltage step ratio and the voltage difference between the present voltage and the voltage for the previous sampling time, and control an output voltage based on the perturbation voltage step.

20 Claims, 3 Drawing Sheets

MAXIMUM POWER POINT TRACKING METHOD AND DEVICE, AND PHOTOVOLTAIC POWER GENERATION SYSTEM

CROSS-REFERENCE TO RELATED APPLICATION

The present application claims priority based on Chinese Patent Application No. 201410283241.1 filed on Jun. 20, 2014, the entire content of which is incorporated herein by reference.

FIELD OF THE INVENTION

The present invention relates to the field of photovoltaic technology, and particularly to a maximum power point tracking method and device, and a photovoltaic power generation system.

BACKGROUND OF THE INVENTION

Utilizing clear solar energy to generate electricity is one of the most effective means for solving the problem of current energy shortage. However, since output voltage and output current of photovoltaic array are influenced by external environment (e.g., illumination intensity, temperature, load characteristic) and factors of itself, output characteristics of photovoltaic array demonstrate obvious non-linear characteristics, with which output power thereof varies constantly. At certain illumination intensity and certain temperature, voltage-power output characteristic curve in which output power of the photovoltaic array changes with operating voltage is a single-peak curve. The photovoltaic array can output the maximum power only when it operates at the peak of the curve, which is called Maximum Power Point (MPP). Since MPP changes according to the illumination intensity and the temperature, the key to improve overall efficiency of the photovoltaic power generation system is to adjust the operating point of the photovoltaic array in real time to keep near to MPP. This procedure is Maximum Power Point Tracking (MPPT).

Thus, in controlling the photovoltaic power generation system, it is particularly important to adjust the load characteristic so that the photovoltaic power generation system can output maximum power in real time as far as it could so as to achieve MPPT. Typical direct control algorithms include Perturbation & Observation Method (P&O), Conductance Increment Method, and so on. This type of control algorithms has higher accuracy than indirect control methods, can achieve real-time MPPT control, and can satisfy ordinary needs for general applications, thus is most widely used in practical engineering.

P&O is the most commonly used algorithm among the control strategies of MPPT, and it is crucial to select a perturbation step for P&O. If a larger perturbation step is used, response of the system to external condition changes is fast, but power fluctuation near MPP is large; on the contrary, if a smaller perturbation step is used, power fluctuation near MPP is small, but response of the system to external condition changes is slow. Therefore, there are contradictions between the dynamic performance and the static performance of P&O with fixed step.

SUMMARY OF THE INVENTION

In view of the problem that there are contradictions between dynamic performance and static performance of MPPT in the prior art, an object of the present invention is to provide a maximum power point tracking method and device, and a photovoltaic power generation system, in which perturbation voltage step is automatically changed according to ratio of the P-U characteristic curve for outputs of the photovoltaic array during perturbation, thus enhancing system optimization efficiency, and improving dynamic performance and static performance of the system.

According to an aspect of the present invention, there is provided a maximum power point tracking method for enabling a photovoltaic array to operate at maximum power point, and the method comprises:

step a: sampling present voltage and present current of the photovoltaic array;

step b: obtaining present power based on the present voltage and the present current sampled at present sampling time;

step c: using a difference between the present power and power for previous sampling time as present perturbation power, and obtaining present gradient perturbation voltage step ratio based on ratio of the present perturbation power to perturbation power for previous sampling time, wherein the power for previous sampling time is obtained based on voltage for previous sampling time and current for previous sampling time which are sampled at previous sampling time, and the perturbation power for previous sampling time is a difference between the power for previous sampling time and power for a sampling time immediately before the previous sampling time;

step d: obtaining perturbation voltage step based on the present gradient perturbation voltage step ratio and a difference between the present voltage and the voltage for previous sampling time; and step e: controlling output voltage of the photovoltaic array based on the perturbation voltage step.

Preferably, the step a specifically comprises step 1: sampling the output voltage and output current of the photovoltaic array for the $k^{th}$ time so as to obtain output voltage $U_k$ and output current $I_k$ for the $k^{th}$ sampling time, wherein k is a natural number, $U_k$ is the present voltage, and $I_k$ is the present current.

Preferably, the step b specifically comprises step 2: calculating output power $P_k$ for the $k^{th}$ sampling time, wherein $P_k = U_k \times I_k$, and $P_k$ is the present power.

Preferably, the step c specifically comprises:

step 3: obtaining perturbation voltage step $\Delta U_k$ and perturbation power $\Delta P_k$ for the $k^{th}$ sampling time through calculation, wherein $\Delta U_k = U_k - U_{k-1}$, $\Delta P_k = P_k - P_{k-1}$, $U_{k-1}$ is the voltage for previous sampling time, $P_{k-1}$ is the power for previous sampling time, $P_{k-1} = U_{k-1} \times I_{k-1}$, and $I_{k-1}$ is current for previous sampling time; and step 4: calculating perturbation voltage step ratio r corresponding to the $k^{th}$ sampling, wherein $k = \Delta P_k / \Delta P_{k-1}$, and $\Delta P_{k-1}$ is perturbation power for the $k-1^{th}$ sampling.

Preferably, the step d specifically comprises step 5: obtaining perturbation voltage step $\Delta U_{k+1}$ corresponding to $k+1^{th}$ sampling through calculation, wherein $\Delta U_{k+1} = |k \times \Delta U_k|$.

Preferably, the step e specifically comprises step 6: based on the perturbation voltage step $\Delta U_{k+1}$, obtaining $Udc\_ref_{k+1}$, which is a reference voltage for DC bus of inverter or a given signal for voltage close loop control of DC/DC converter in inverter, so as to control the output voltage of the photovoltaic array, wherein:

$$\text{Udc\_ref}_{k+1} = \begin{cases} \text{Udc\_ref}_k + \Delta U_{k+1}, & \Delta P_k \times \Delta U_k > 0 \\ \text{Udc\_ref}_k - \Delta U_{k+1}, & \Delta P_k \times \Delta U_k < 0 \end{cases},$$

Udc_ref$_{k+1}$ is a reference voltage for the DC bus of the inverter corresponding to the k+1$^{th}$ sampling or a given signal for the voltage close loop control of the DC/DC converter in the inverter corresponding to the k+1$^{th}$ sampling, Udc_ref$_k$ is a reference voltage for the DC bus of the inverter corresponding to the k$^{th}$ sampling or a given signal for the voltage close loop control of the DC/DC converter in the inverter corresponding to the k$^{th}$ sampling, $\Delta U_{k+1}$ is a perturbation voltage step for the DC bus of the inverter corresponding to the k+1$^{th}$ sampling or a given signal for the voltage close loop control of the DC/DC converter in the inverter corresponding to the k+1$^{th}$ sampling, $\Delta U_k$ is perturbation voltage step corresponding to the k$^{th}$ sampling, and $\Delta P_k$ is perturbation power corresponding to the k$^{th}$ sampling.

Preferably, the maximum power point tracking method further comprises step 7: repeating the steps 1 to 6, so as to enable the photovoltaic array to operate at the maximum power point.

Preferably, the maximum power point tracking method, prior to the step 1, further comprises: assigning initial values to the perturbation voltage step $\Delta U_k$ and the perturbation voltage step ratio r, the initial value of the perturbation voltage step $\Delta U_k$ ranges from 1V to 3 V, and the initial value of the perturbation voltage step ratio r is 1.

Preferably, when the inverter is started for the first time, the reference voltage for the DC bus of the inverter or the given signal for the voltage close loop control of the DC/DC converter in the inverter is set to a value that is 0.6-0.8 times the value of an open circuit voltage of the photovoltaic array.

Preferably, when the inverter is started for the first time, the reference voltage for the DC bus of the inverter or the given signal for the voltage close loop control of the DC/DC converter in the inverter is set to a value that is 0.76 times the value of the open circuit voltage of the photovoltaic array and the initial value of the perturbation voltage step $\Delta U_k$ is set to be 1 V.

Preferably, in the steps 2 and 3, $U_{k-1}$, $U_k$, $I_{k-1}$, and $I_k$ are mean-filtered in advance, respectively.

Preferably, in the step 5, reliable voltage range for $\Delta U_{k+1}$ is 1-15 V; $\Delta U_{k+1}$ is limited to be 1 V when it is smaller than 1 V, and is limited to be 15 V when it is larger than 15 V.

Preferably, in the step 7, if $\Delta P_k$ is determined to be smaller than a predetermined perturbation limitation for n times in succession, it is determined that the photovoltaic array operates at the maximum power point, and thus perturbation is stopped, wherein 4≤n≤6, and the predetermined perturbation limitation is 0.1% of rated power of the photovoltaic array.

According to another aspect of the invention, there is provided a maximum power point tracking device comprising: a sampling unit, a calculating unit, a step ratio generating unit, a perturbation voltage step generating unit, and an outputting unit, wherein:

the sampling unit is configured to sample voltage and current of a photovoltaic array;

the calculating unit is configured to obtain present power, power for previous sampling time, present power difference which is a difference between the present power and the power for previous sampling time, and voltage difference between the present voltage and the voltage for previous sampling time, based on present voltage and present current sampled by the sampling unit at present sampling time, and voltage for previous sampling time and current for previous sampling time sampled at the previous sampling time;

the step ratio generating unit is configured to use the present power difference obtained by the calculating unit as present perturbation power, and to obtain present gradient perturbation voltage step ratio based on ratio of the present perturbation power to perturbation power for previous sampling time;

the perturbation voltage step generating unit is configured to obtain perturbation voltage step, based on the present gradient perturbation voltage step ratio obtained by the step ratio generating unit and the voltage difference between the present voltage and the voltage for previous sampling time obtained by the calculating unit; and the outputting unit is configured to control output voltage, based on the perturbation voltage step obtained by the perturbation voltage step generating unit.

Preferably, the maximum power point tracking device further comprises an initial value assigning unit configured to assign an initial value to the perturbation voltage step of the photovoltaic array, and the initial value of the perturbation voltage step ranges from 1V to 3 V.

Preferably, the maximum power point tracking device further comprises an mean filtering unit configured to perform mean filtering processing on sampled voltage values and current values.

Preferably, the maximum power point tracking device further comprises a amplitude limiting unit configured to limit reliable voltage range of the perturbation voltage step to be within 1-15 V, wherein $\Delta U_{k+1}$ is limited to be 1 V when it is smaller than 1 V, and is limited to be 15 V when it is larger than 15 V.

According to still another aspect of the invention, there is provided a photovoltaic power generation system, which comprises a photovoltaic array, and further comprises the above maximum power point tracking device.

Preferably, the photovoltaic power generation system comprises a single-stage photovoltaic grid-connected inverter, and output voltage of the maximum power point tracking device is a reference voltage for DC bus of the inverter; or the photovoltaic power generation system comprises a double-stage photovoltaic grid-connected inverter, and output voltage of the maximum power point tracking device is a given signal for voltage close loop control of DC/DC converter in the inverter.

The advantageous effects of the present invention are as follows.

The maximum power point tracking method of the invention is based on gradient variable step perturbation method, in which value of the perturbation voltage step is determined according to change of difference between two powers for two adjacent samplings, thereby reference value of output voltage of the photovoltaic array is calculated, and the reference value of the output voltage is used as reference voltage value for DC bus of inverter in a single-stage photovoltaic grid-connected inverter, or used as a given signal value for voltage close loop control of DC/DC converter in the inverter in a double-stage photovoltaic grid-connected inverter. Since speed of tracking the maximum power point is efficiently improved and power fluctuation near the maximum power point is lowered, the dynamic performance and the static performance of the photovoltaic power generation system can be efficiently improved. Furthermore, the maximum power point tracking method has simple principle, rapid tracking speed and high stability, is easy to implement, will not increase the cost for the inverter of the photovoltaic power generation system, and has general applicability.

DETAILED DESCRIPTION OF THE EMBODIMENTS

Figure 1:
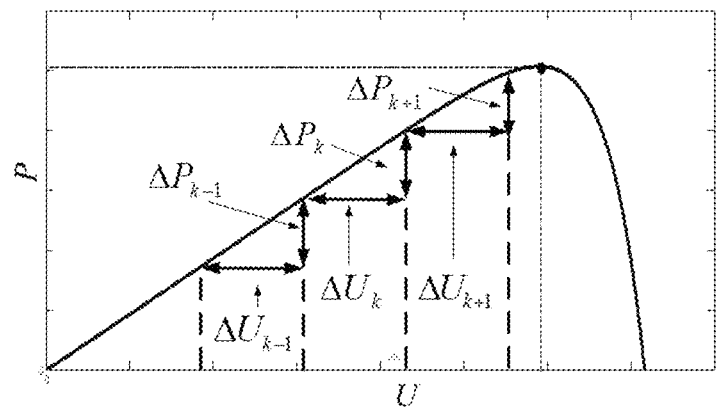
FIG. 1 is a schematic diagram illustrating calculation of gradient perturbation voltage step in maximum power point tracking method according to first embodiment of the invention.

The maximum power point tracking method and device, and the photovoltaic power generation system of the present invention are described below in detail in conjunction with the accompanying drawings as well as specific embodiments to enable a skilled person in the art to fully understand the technical solutions of the present invention.

First Embodiment

In this embodiment, a maximum power point tracking method and device are provided and applied to a single-stage photovoltaic grid-connected generation system. The maximum power point tracking method of this embodiment is based on gradient variable step P&O.

A maximum power point tracking method for enabling a photovoltaic array to operate at maximum power point comprises:

step a: sampling present voltage and present current of the photovoltaic array;

step b: obtaining present power based on the present voltage and the present current sampled at present sampling time;

step c: using a difference between the present power and power for previous sampling time as present perturbation power, and obtaining present gradient perturbation voltage step ratio based on ratio of the present perturbation power to perturbation power for previous sampling time, wherein the power for previous sampling time is obtained based on voltage for previous sampling time and current for previous sampling time which are sampled at previous sampling time, and the perturbation power for previous sampling time is a difference between the power for previous sampling time and power for a sampling time immediately before the previous sampling time;

step d: obtaining perturbation voltage step based on the present gradient perturbation voltage step ratio and voltage difference between the present voltage and the voltage for previous sampling time; and step e: controlling output voltage of the photovoltaic array based on the perturbation voltage step.

The maximum power point tracking method in this embodiment may repeatedly perform the above step a to step e, such that the output voltage is controlled to approach to the maximum power point. Herein, performing steps a to e one time is referred to as "a cycle", sampling performed in the $k^{th}$ cycle is referred to as "$k^{th}$ sampling", and time corresponding to the $k^{th}$ sampling is referred to as "$k^{th}$ sampling time".

Specifically, the above step a may comprise:

Step 1: sampling the output voltage and output current of the photovoltaic array for the $k^{th}$ time, so as to obtain output voltage $U_k$ and output current $I_k$ for the $k^{th}$ sampling time, wherein k is a natural number. It will be understood that $U_k$ can be regard as the present voltage, and $I_k$ can be regard as the present current.

The maximum power point tracking method of this embodiment may, prior to the step 1, further comprises: assigning initial values to the perturbation voltage step $\Delta U_k$ and the perturbation voltage step ratio r. Preferably, the initial value $\Delta U_1$ of the perturbation voltage step $\Delta U_k$ may be a value ranging from 1V to 3 V, and the initial value $r_1$ of the perturbation voltage step ratio r may be set to be 1. That is, once the maximum power point tracking method is started, the perturbation voltage step $\Delta U_k$ and the perturbation voltage step ratio r are assigned with initial values, in order to avoid occurrence of error caused by using, when starting the maximum power point tracking method again, the last values remaining at previous stop.

In the method, length of sampling period is not limited. It can be understood that, the shorter the sampling period is, the more the sampled data are, the more the data obtained by subsequent calculations are, and the higher the real-time performance is; however, it requires higher performance of the hardware for data calculation. In practice, the length of the sampling period may be set or adjusted according to the requirements on system monitoring, and is not limited herein.

When the inverter is not started, the voltage of the photovoltaic array is not controlled by the inverter, and is equal to open circuit voltage. When the inverter is started, the voltage of the photovoltaic array is controlled by the inverter. After the maximum power point tracking device is started, reference value of control voltage of the photovoltaic array is calculated by using the maximum power point tracking method. It can be known from the characteristics of the photovoltaic array that the maximum power point of the photovoltaic array is generally near 0.76 times of the open circuit voltage. Accordingly, when the inverter is started for the first time (the inverter is started for the first time when the photovoltaic power generation system is powered on, or the inverter is started again after it is stopped), the reference value of the control voltage of the photovoltaic array, which is a reference value of voltage for DC bus of inverter or a given signal value for the voltage close loop control of DC/DC converter in inverter, may be set to be 0.6-0.8 times of the open circuit voltage of the photovoltaic array. In order that the maximum power point of the photovoltaic array can be found as soon as possible after starting the maximum power point tracking method, the maximum power point tracking method may be stopped at first (or not started at the beginning). Once it is monitored by voltage monitoring device that the output voltage of the photovoltaic array is about 0.76 times of the open circuit voltage, the maximum power point tracking method is started to track the maximum output power in real time. Therefore, when the inverter is started for the first time, it may be more preferred to set the reference voltage for the DC bus of the inverter or the given signal for the voltage close loop control of the DC/DC converter in the inverter to be 0.76 times of the open circuit voltage of the photovoltaic array, and set the initial value of the perturbation voltage step $U_k$ to be 1V.

Further, the above step b may comprise:

Step 2: calculating output power $P_k$ for the $k^{th}$ sampling time, wherein $P_k = U_k \times I_k$. It can be understood that $P_k$ may be regarded as the present power.

To obtain more accurate output, preferably, in this step, $U_k$ and $I_k$ may be respectively mean-filtered in advance so as to eliminate stray interference.

Further, the above step c may comprise step 3 and step 4.

At Step 3, perturbation voltage step $\Delta U_k$ and perturbation power $\Delta P_k$ for the $k^{th}$ sampling time are calculated, wherein $\Delta U_k = U_k - U_{k-1}$, $\Delta P_k = P_k - P_{k-1}$, $U_k$ is the voltage for the $k^{th}$ sampling time (the present voltage), $U_{k-1}$ is the voltage for the $k-1^{th}$ sampling time (the voltage for previous sampling time), $P_k$ is the power for the $k^{th}$ sampling time (the present power), $P_{k-1}$ is the power for $k-1^{th}$ sampling time (the power for previous sampling time) which is calculated based on the voltage $U_{k-1}$ for previous sampling time and the current $I_{k-1}$ for previous sampling time obtained at the $k-1^{th}$ sampling time (the previous sampling time), and $P_{k-1} = U_{k-1} \times I_{k-1}$. It should be understood that, in the first cycle (k=1), the power for previous sampling time $P_{k-1}$ may be set to be initial value $P_0$ (e.g., 0, or a value of power measured or estimated before the maximum power point tracking method is started), instead of being calculated with the formula $P_{k-1} = U_{k-1} \times I_{k-1}$.

In this step, $\Delta U_k$ and $\Delta P_k$ may be regarded as a present perturbation voltage step and a present perturbation power, respectively.

At Step 4, perturbation voltage step ratio r corresponding to the $k^{th}$ sampling is calculated, wherein $r = \Delta P_k / \Delta P_{k-1}$. r may be regarded as a present gradient perturbation voltage step ratio.

In this step, $\Delta P_{k-1}$ is a perturbation power having been obtained at the last time (in the $k-1^{th}$ cycle). As shown in FIG. 1, during the process of optimizing the output power of the photovoltaic array so as to make it approach to the MPP, the magnitude of the perturbation power $\Delta P$ is reduced continuously, the perturbation voltage step $\Delta U$ is reduced continuously, and the perturbation voltage step ratio r is also reduced continuously; near the MPP, the perturbation voltage step $\Delta U$ approaches to 0, and the perturbation voltage step ratio r approaches to 0, so that stable output of the maximum power is achieved, achieving the purpose of the MPPT.

It can be seen from FIG. 1 that, the maximum power point tracking method of the present invention is based on a manner of taking gradient perturbation voltage variable step, which is different from the manner of taking perturbation voltage variable step in the prior art. That is, the perturbation power $\Delta P$ (a difference between output powers for any two adjacent samplings, such as $\Delta P_{k-1}$ and $\Delta P_k$, or $\Delta P_k$ and $\Delta P_{k+1}$) and the perturbation voltage step $\Delta U$ (a difference between output voltages for any two adjacent samplings, such as $\Delta U_{k-1}$ and $\Delta U_k$, or $\Delta U_k$ and $\Delta U_{k+1}$) are varied in a gradient manner. Further, the perturbation voltage step $\Delta U$ varies continuously, and the perturbation voltage step ratio r obtained based on the perturbation power $\Delta P$ also varies continuously.

Further, the above step d may comprise:

Step 5: calculating perturbation voltage step $\Delta U_{k+1}$ corresponding to $k+1^{th}$ sampling, wherein $\Delta U_{k+1} = |k \times \Delta U_k|$.

In addition, as described above, before starting sampling, the perturbation voltage step $\Delta U_k$ and the perturbation voltage step ratio r have been assigned with initial values, respectively. Thus, when performing the first cycle, although the present power $P_1$ is calculated based on the present voltage $U_1$ and present current $I_1$ which are measured in real time, the perturbation voltage step $\Delta U_{k+1}$ which will be used in the second cycle is calculated directly based on the initial values of the perturbation voltage step $\Delta U_k$ and the perturbation voltage step ratio r, that is, $\Delta U_2 = |r_1 \times \Delta U_1|$. The present power $P_1$ calculated is simply stored for calculations in subsequent cycles. Also, in the first cycle, the present perturbation power $\Delta P_1$ calculated based on the present power $P_1$ and the power for previous sampling time which is set to be the initial value $P_0$ is simply stored for calculations in subsequent cycles, but is not used for calculating the present perturbation voltage step ratio r.

In the step 5, in order to prevent that the calculated perturbation voltage step when starting the maximum power point tracking method is too large and thereby to ensure stable operation of the inverter, a reliable voltage range is set for the perturbation voltage step during the control process of the maximum power point tracking method, so that $\Delta U_{k+1}$ will be limited if it goes beyond the range. The reliable voltage range of $\Delta U_{k+1}$ is 1-15 V. For example, when $\Delta U_{k+1}$ is smaller than 1 V, $\Delta U_{k+1}$ will be limited to be the lower limit 1 V of the reliable voltage range. When $\Delta U_{k+1}$ is larger than 15 V, $\Delta U_{k+1}$ will be limited to be the upper limit 15 V of the reliable voltage range.

Further, the above step e may comprise:

Step 6: based on the perturbation voltage step $\Delta U_{k+1}$, obtaining $Udc\_ref_{k+1}$, which is a reference voltage for the DC bus of the inverter or a given signal for the voltage close loop control of the DC/DC converter in the inverter, so as to control the output voltage of the photovoltaic array, wherein:

$$Udc\_ref_{k+1} = \begin{cases} Udc\_ref_k + \Delta U_{k+1}, & \Delta P_k \times \Delta U_k > 0 \\ Udc\_ref_k - \Delta U_{k+1}, & \Delta P_k \times \Delta U_k < 0 \end{cases}.$$

$Udc\_ref_{k+1}$ is a reference voltage for the DC bus of the inverter (in the case of a single-stage photovoltaic grid-connected generation system) corresponding to the $k+1^{th}$ sampling (the $k+1^{th}$ cycle), or a given signal for the voltage close loop control of the DC/DC converter in the inverter (in the case of a double-stage photovoltaic grid-connected generation system) corresponding to the $k+1^{th}$ cycle, $Udc\_ref_k$ is a reference voltage for the DC bus of the inverter corresponding to the $k^{th}$ cycle or a given signal for the voltage close loop control of the DC/DC converter in the inverter corresponding to the $k^{th}$ cycle, $\Delta U_{k+1}$ is a perturbation voltage step for the DC bus of the inverter corresponding to the $k+1^{th}$ cycle or a given signal for the voltage close loop control of the DC/DC converter in the inverter corresponding to the $k+1^{th}$ cycle, $\Delta U_k$ is perturbation voltage step corresponding to the $k^{th}$ cycle, and $\Delta P_k$ is perturbation power corresponding to the $k^{th}$ cycle.

It can be understood that, in this step, for example, in the case of a single-stage photovoltaic grid-connected generation system, $Udc\_ref_k$ is present reference voltage for the DC bus of the inverter, $\Delta U_k$ and $\Delta P_k$ are the present perturbation voltage step and the present perturbation power, respectively; $Udc\_ref_{k+1}$ is the reference voltage for the DC bus of the inverter in the next cycle, and $\Delta U_{k+1}$ is the perturbation voltage step in the next cycle.

Figure 2:
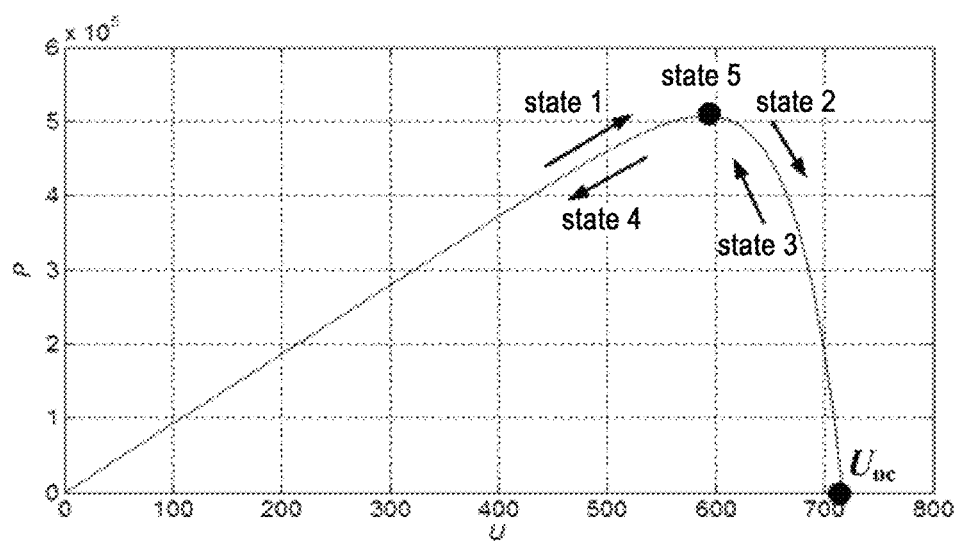
FIG. 2 is a schematic diagram illustrating perturbation states in calculation of the gradient perturbation voltage step according to the first embodiment of the invention.

FIG. 2 shows five types of perturbation states that possibly occur during the entire perturbation procedure of the MPPT. As shown in FIG. 2, state 1 is located on the left of the MPP, and perturbs towards the MPP; state 2 is located on the right of the MPP, and perturbs away from the MPP; state 3 is located on the right of the MPP, and perturbs towards the MPP; state 4 is located on the left of the MPP, and perturbs away from the MPP; and state 5 corresponds to the MPP. In the step 6, the principle of voltage adjustment is: for the state 1 and the state 4 in which the present perturbation power $\Delta P_k$ and the present perturbation voltage step $\Delta U_k$ are both positive or negative (i.e., $\Delta P_k \times \Delta U_k > 0$), a perturbation voltage step ΔU$_{k+1}$ is added to the voltage; for the state 2 and the state 3 in which one of the present perturbation power ΔP$_k$ and the present perturbation voltage step ΔU$_k$ is positive while the other is negative (i.e., ΔP$_k$×ΔU$_k$<0), a perturbation voltage step ΔU$_{k+1}$ is subtracted from the voltage. That is, $$Udc\_ref_{k+1}=Udc\_ref_k+\Delta U_{k+1}, \text{ if } \Delta P_k \times \Delta U_k>0;$$

$$Udc\_ref_{k+1}=Udc\_ref_k-\Delta U_{k+1}, \text{ if } \Delta P_k \times \Delta U_k<0.$$

Further, the maximum power point tracking method may comprise:

Step 7: repeating the steps 1 to 6, so as to enable the photovoltaic array to operate at the maximum power point.

In this step, if ΔP$_k$ is determined to be smaller than a predetermined perturbation limit for n times in succession, it is determined that the photovoltaic array operates at the MPP, and thus perturbation is stopped, wherein 4≤n≤6. Preferably, the perturbation limit may be set to be 0.1% of rated power of the photovoltaic array. Preferably, n=5.

The maximum power point tracking method of this embodiment is based on an idea of gradient perturbation voltage variable step optimization. The output power of the photovoltaic array is calculated based on output voltage and output current which are obtained by sampling and then are mean-filtered; with reference to the output voltage-output power characteristic curve of the photovoltaic array, based on the difference between the power calculated at last time and the power calculated at this time and the difference between the perturbation voltage step calculated at last time and the perturbation voltage step calculated at this time, value and perturbation direction of perturbation voltage step for the next time are estimated, that is, the perturbation voltage step is changed automatically according to the slope of the P-U characteristic curve during the perturbation procedure. Thereby, reference value of the output voltage of the photovoltaic array is generated and is used as given voltage signal for the close loop control of the inverter. In the maximum power point tracking method, after a region near the MPP is found, the perturbation voltage step is decreased rapidly so as to narrow searching area to improve searching accuracy, until the MPP is found out. Thus, the maximum power point tracking method of the present invention has simple algorithm, improves optimization efficiency of photovoltaic power generation system, and solves contradictions between the dynamic performance and the static performance existing in ordinary P&O.

According to another aspect of the present invention, accordingly, the present embodiment further provides a maximum power point tracking device corresponding to the above maximum power point tracking method, and the device comprises: a sampling unit, a calculating unit, a step ratio generating unit, a perturbation voltage step generating unit, and an outputting unit, wherein:

the sampling unit is configured to sample present voltage and present current of a photovoltaic array;

the calculating unit is configured to obtain present power, power for previous sampling time, present power difference which is a difference between the present power and the power for previous sampling time, and voltage difference between the present voltage and the voltage for previous sampling time, based on the present voltage and the present current sampled by the sampling unit at present sampling time, and voltage for previous sampling time and current for previous sampling time sampled at the previous sampling time;

the step ratio generating unit is configured to use the present power difference calculated by the calculating unit as present perturbation power, and to obtain present gradient perturbation voltage step ratio based on ratio of the present perturbation power to perturbation power for previous sampling time;

the perturbation voltage step generating unit is configured to obtain perturbation voltage step, based on the present gradient perturbation voltage step ratio obtained by the step ratio generating unit and the voltage difference between the present voltage and the voltage for previous sampling time calculated by the calculating unit; and the outputting unit is configured to control output voltage, based on the perturbation voltage step obtained by the perturbation voltage step generating unit.

Preferably, the maximum power point tracking device further comprises an initial value assigning unit configured to assign initial value for the perturbation voltage step of the photovoltaic array. For example, the initial value of the perturbation voltage step may range from 1V to 3 V. The initial value assigning unit may also be configured to assign initial value for the perturbation voltage step ratio and the power for previous sampling time. For example, once the maximum power point tracking device is started, the initial value assigning unit may assign value 1 to the present perturbation voltage step, assign value 1 to the present perturbation voltage step ratio, and assign value 0 to the power for previous sampling time.

Preferably, the maximum power point tracking device further comprises a mean filtering unit configured to perform mean filtering processing on sampled voltage values and current values.

Preferably, the maximum power point tracking device further comprises a amplitude limiting unit configured to limit reliable voltage range of the perturbation voltage step to be within 1-15 V. ΔU$_{k+1}$ will be limited to be 1 V or 15 V when it is not fallen within the reliable voltage range (smaller than 1 V or larger than 15 V).

Figure 3:
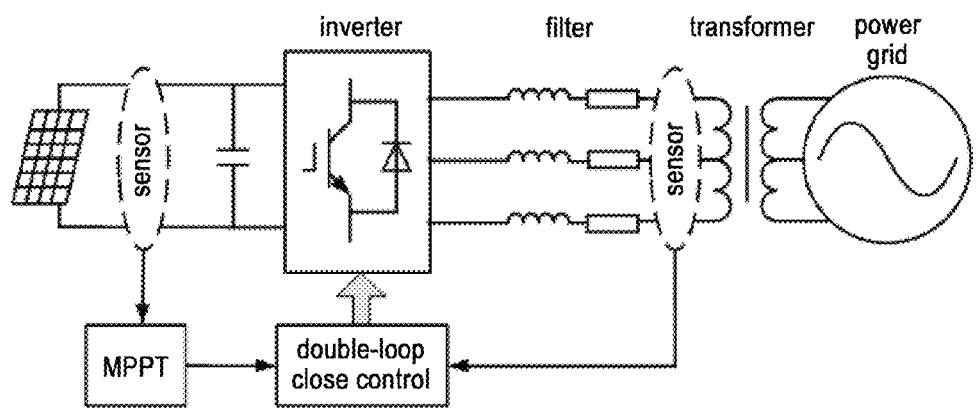
FIG. 3 is a schematic diagram illustrating a single-stage photovoltaic grid-connected generation system according to the first embodiment of the invention.

According to still another aspect of the invention, the present embodiment also provides a photovoltaic power generation system comprising photovoltaic array and the above maximum power point tracking device. As shown in FIG. 3, the photovoltaic power generation system in the present embodiment is a single-stage photovoltaic grid-connected generation system. The output voltage of the maximum power point tracking device is the reference voltage for the DC bus of the inverter, that is, Udc_ref$_{k+1}$ is the reference voltage for the DC bus of the inverter for the k+1$^{th}$ cycle. The single-stage photovoltaic grid-connected generation system is generally applicable to high-power system, and has advantages of high power, low cost and simple control.

In order to achieve better effect of controlling, the photovoltaic power generation system preferably comprises current close-loop control. The current close-loop control is used as inner loop control, while the output voltage of the maximum power point tracking device is used for external loop control. With the voltage and current double-loop close control, the stability of the system can be further enhanced.

In the single-stage photovoltaic grid-connected generation system, the photovoltaic array is connected directly to supply capacitor for the DC bus of the inverter. The output voltage of the photovoltaic array is changed by changing the voltage of the DC bus of the inverter. Accordingly, Udc_ref$_{k+1}$ is calculated by the maximum power point tracking method provided by the present embodiment, and is used as the given signal for the voltage external loop for the double-loop close control of the inverter so as to control the inverter. Thus, the output voltage of the photovoltaic array may follow the variation of the reference voltage in real time.

Figure 4:
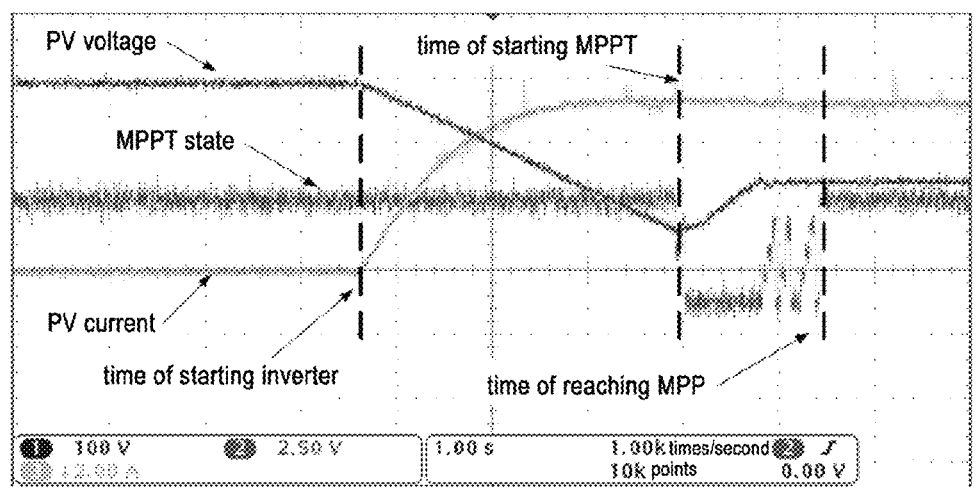
FIG. 4 is a schematic diagram illustrating waveform of MPPT states during initial procedure of starting MPPT in the system as shown in FIG. 3.

In the single-stage photovoltaic grid-connected generation system as shown in FIG. 3, the photovoltaic inverter is connected with a 10 kW photovoltaic array (formed by 2 parallel-connected units in each of which 17 cells are series connected). The open circuit voltage is 760 V, and the grid-connected voltage is 270 V. When the above maximum power point tracking method in which variable-step perturbation & observation method is combined with power prediction is applied, perturbation period is 0.05 s, basic perturbation step is 1 V (i.e., the initial perturbation voltage step is 1 V). Before starting the maximum power point tracking method, the value of the open circuit voltage is recorded. To validate the dynamic performance of the maximum power point tracking method during initial procedure after it is started, starting target slope voltage is set to be 0.6 times of the open circuit voltage in advance (it should be set to be 0.76 times of the open circuit voltage during normal operation), thereafter, the maximum power point tracking method is started and its dynamic tracking performance is observed. The measured experimental dynamic waveform is as shown in FIG. 4 which shows a diagram illustrating MPPT waveform during initial procedure of starting MPPT in the system as shown in FIG. 3. In the curve as indicated by the words "MPP state" in FIG. 4, a section located between the broken line indicated by words "time of starting MPPT" and the broken line indicated by words "time of reaching MPP" reflects various states (oscillation phenomenon) during the MPP perturbation procedure as shown in FIG. 2. As shown in FIG. 4, after several oscillations from state 1 to state 4, the "MPP state" eventually stays at the state 5, that is to say, the MPP is found out. In FIG. 4, "PV (Photo Voltaic, i.e. the photovoltaic array) voltage" is the voltage of the photovoltaic array, "PV current" is the current of the photovoltaic array. From FIG. 4, it can be seen that, "MPP state" can arrive near the MPP at about 1 s after starting the maximum power point tracking method, which proves that the maximum power point tracking method has good dynamic tracking performance. In addition, in order to conveniently observe the perturbation direction during running of the maximum power point tracking method, as shown in FIG. 2 which illustrates the states during perturbation procedure, if $\Delta P_k$ is determined to be smaller than the perturbation limit (which is used for weighing the magnitude of the perturbation power) for n times in succession, it is determined that the perturbation power is small enough, i.e., the photovoltaic array operates at the maximum power point at this time, and thus perturbation is stopped.

Figure 5:
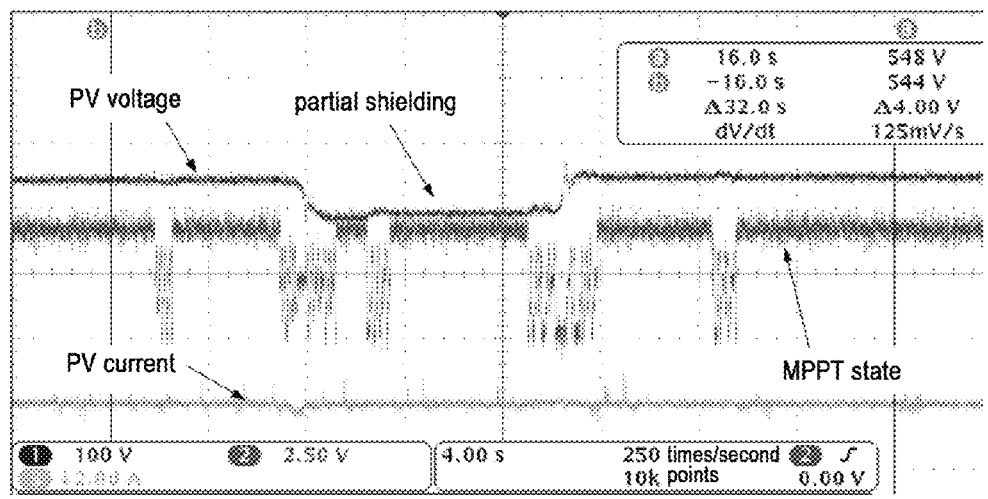
FIG. 5 is a schematic diagram illustrating waveform of MPPT states when there is a sudden change in external conditions during running of MPPT in the system as shown in FIG. 3.

In order to further validate the dynamic performance of the maximum power point tracking method during running thereof, the photovoltaic array is shielded partially during running. The measured experimental dynamic waveform is as shown in FIG. 5 which shows a diagram illustrating waveform of MPPT states when there is a sudden change in external conditions during running of MPPT in the system as shown in FIG. 3. In FIG. 5, $t_1$ is response time of the maximum power point tracking method after partial shielding occurs, and $t_2$ is response time of the maximum power point tracking method when partial shielding is removed. Each of $t_1$ and $t_2$ is about 2.7 s. It can be seen that, when partial shielding occurs or is removed, the maximum power point tracking method can respond rapidly, stop oscillation within very short period of time, and find out the MPP of the power curve. Further, if oscillation from the state 1 to state 4 frequently occurs after the state 5 is reached, then the perturbation voltage step ratio r may be further adjusted so as to enable the MPP state curve to reach the state 5 again.

In the above initial starting-procedure experiment and running experiment, the photovoltaic power generation system can quickly get into stable operation state after finishing the perturbation, which means that the maximum power point tracking method has perfect static performance.

The maximum power point tracking device of the embodiment and the system comprising this device is based on the maximum power point tracking method of gradient perturbation voltage step perturbation, in which value of the perturbation voltage step is determined according to change of difference between the present power and the power for previous sampling time, thereby reference value of output voltage of the photovoltaic array is calculated, and the reference value of the output voltage is used as given signal value for the voltage external loop in the double-loop close control of single-stage photovoltaic grid-connected inverter, so as to be used for controlling the inverter. Since speed of tracking the maximum power point is efficiently improved and power fluctuation near the maximum power point is lowered, the dynamic performance and the static performance of the photovoltaic power generation system can be efficiently improved.

Second Embodiment

The present embodiment provides a photovoltaic power generation system. Compared with the first embodiment, the photovoltaic power generation system in the present embodiment is a double-stage photovoltaic grid-connected generation system.

The maximum power point tracking method and device in the first embodiment can be used to not only control a single-stage photovoltaic grid-connected generation system, but also control a double-stage photovoltaic grid-connected generation system. The only difference of the photovoltaic power generation system in the present embodiment from that in the first embodiment is that, the control object of the maximum power point tracking method used in the system is different. In the single-stage photovoltaic grid-connected generation system, the maximum power point tracking method is achieved by changing the voltage close-loop reference value of the DC bus, while in the double-stage photovoltaic grid-connected generation system, the maximum power point tracking method is achieved by controlling the input voltage of the DC/DC converter circuit.

Figure 6:
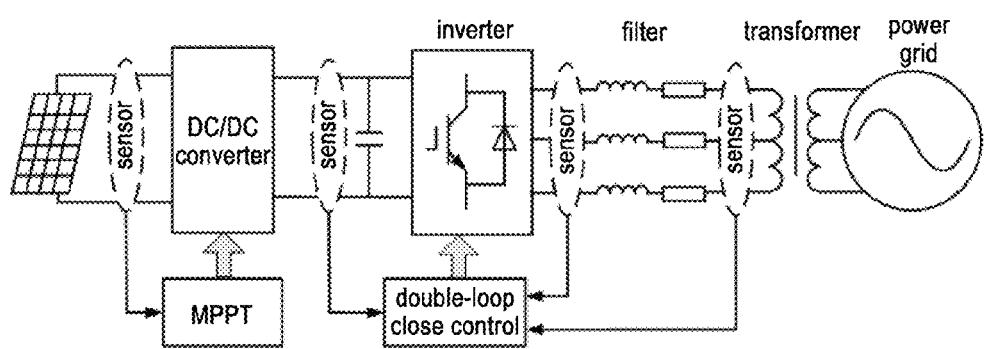
FIG. 6 is a schematic diagram illustrating a double-stage photovoltaic grid-connected generation system according to a second embodiment of the invention.

In the double-stage photovoltaic grid-connected generation system, the photovoltaic array is connected to the DC/DC converter, and power is supplied to power grid through the DC/AC inverter. As shown in FIG. 6, the photovoltaic power generation system in the present embodiment comprises a double-stage photovoltaic grid-connected inverter. The output voltage of the maximum power point tracking device is the given signal for the voltage close loop control for the DC/DC converter in the inverter, that is, $Udc\_ref_{k+1}$ is the given signal of voltage close loop control for the DC/DC converter in the inverter for the $k+1$ cycle. With the maximum power point tracking method, $Udc\_ref_{k+1}$ is calculated as the given signal for the voltage close loop control for the DC/DC converter in the inverter, and used for controlling. The output voltage of the photovoltaic array will follow the variation of the reference voltage in real time. The double-stage photovoltaic grid-connected generation system is generally applicable to medium power and low power system, has high conversion efficiency, and can achieve independent optimization for multiple inputs in MPPT.

The photovoltaic power generation system of the embodiment is based on the maximum power point tracking method of gradient perturbation voltage step perturbation, in which value of the perturbation voltage step is determined according to change of difference between the present power and the power for previous sampling time, thereby reference value of output voltage of the photovoltaic array is calculated, and the reference value of the output voltage is used as a given signal value for voltage close loop control of the DC/DC converter in the inverter in the double-loop close control of double-stage photovoltaic grid-connected inverter, so as to be used for controlling the inverter. Since speed of tracking the maximum power point is efficiently improved and power fluctuation near the maximum power point is lowered, the dynamic performance and the static performance of the photovoltaic power generation system can be efficiently improved.

From the first and second embodiments, it can be seen that the maximum power point tracking method based on gradient variable voltage step P&O in the present invention can efficiently solve the problem that there are contradictions between the dynamic performance and the static performance of P&O in the prior art. The maximum power point tracking method has simple principle, rapid tracking speed and high stability, is easy to implement, will not increase the cost for the inverter of the photovoltaic power generation system, and has general applicability.

The present invention may be implemented in manner of software (for example, programs stored in a storage medium such as a optical disk and distributed, or programs capable of being retrieved from a specific server), firmware or hardware, or any combination or cooperation thereof.

It can be understood that the above embodiments are only exemplary embodiments for illustrating the principle of the present invention; however, the present invention is not limited thereto. As for a person skilled in the art, various variations and improvements can be made without departing from the spirit and essence of the present invention, and these variations and improvements should be considered to be within the protection scope of the present invention.

The invention claimed is:

1. A maximum power point tracking method, for enabling a photovoltaic array to operate at maximum power point, comprising:
   step a: sampling a present voltage and a present current of the photovoltaic array;
   step b: obtaining a present power based on the present voltage and the present current sampled at a present sampling time;
   step c: using a difference between the present power and a power for a previous sampling time as a present perturbation power, and obtaining a present gradient perturbation voltage step ratio based on a ratio of the present perturbation power to a perturbation power for a previous sampling time, wherein the power for the previous sampling time is obtained based on a voltage for the previous sampling time and a current for the previous sampling time which are sampled at the previous sampling time, and the perturbation power for the previous sampling time is a difference between the power for the previous sampling time and a power for a sampling time immediately before the previous sampling time;
   step d: obtaining a perturbation voltage step based on the present gradient perturbation voltage step ratio and a voltage difference between the present voltage and the voltage for the previous sampling time; and
   step e: controlling an output voltage of the photovoltaic array based on the perturbation voltage step.

2. The maximum power point tracking method of claim 1, wherein:
   the step a specifically comprises step 1: sampling the output voltage and an output current of the photovoltaic array for the $k^{th}$ sampling time so as to obtain an output voltage $U_k$ and an output current $I_k$ for the $k^{th}$ sampling time, wherein k is a natural number, $U_k$ is the present voltage, and $I_k$ is the present current;
   the step b specifically comprises step 2: calculating an output power $P_k$ for the $k^{th}$ sampling time, wherein $P_k = U_k \times I_k$, and $P_k$ is the present power;
   the step c specifically comprises:
   step 3: calculating a perturbation voltage step $\Delta U_k$ and a perturbation power $\Delta P_k$ for the $k^{th}$ sampling time, wherein $\Delta U_k = U_k - U_{k-1}$, $\Delta P_k \times P_k - P_{k-1}$, $U_{k-1}$ is the voltage for the previous sampling time, $P_{k-1}$ is the power for the previous sampling time, $P_{k-1} = U_{k-1} \times I_{k-1}$, and $I_{k-1}$ is the current for the previous sampling time, and
   step 4: calculating a perturbation voltage step ratio r corresponding to the $k^{th}$ sampling time, wherein $k = \Delta P_k / \Delta P_{k-1}$, and $\Delta P_{k-1}$ is a perturbation power for the $k-1^{th}$ sampling time;
   the step d specifically comprises step 5: calculating a perturbation voltage step $\Delta U_{k+1}$ corresponding to $k+1^{th}$ sampling, wherein $\Delta U_{k+1} = |k \times \Delta U_k|$;
   the step e specifically comprises step 6: based on the perturbation voltage step $\Delta U_{k+1}$, obtaining $Udc\_ref_{k+1}$, which is a reference voltage for a DC bus of an inverter or a given signal for a voltage close loop control of a DC/DC converter in the inverter, so as to control the output voltage of the photovoltaic array, wherein:

$$Udc\_ref_{k+1} = \begin{cases} Udc\_ref_k + \Delta U_{k+1}, \Delta P_k \times \Delta U_k > 0 \\ Udc\_ref_k - \Delta U_{k+1}, \Delta P_k \times \Delta U_k < 0 \end{cases},$$

$Udc\_ref_{k+1}$ is a reference voltage for the DC bus of the inverter corresponding to the $k+1^{th}$ sampling or a given signal for the voltage close loop control of the DC/DC converter in the inverter corresponding to the $k+1^{th}$ sampling, $Udc\_ref_k$ is a reference voltage for the DC bus of the inverter corresponding to the $k^{th}$ sampling or a given signal for the voltage close loop control of the DC/DC converter in the inverter corresponding to the $k^{th}$ sampling, $\Delta U_{k+1}$ is a perturbation voltage step for the DC bus of the inverter corresponding to the $k+1^{th}$ sampling or a given signal for the voltage close loop control of the DC/DC converter in the inverter corresponding to the $k+1^{th}$ sampling, $\Delta U_k$ is the perturbation voltage step corresponding to the $k^{th}$ sampling, and $\Delta P_k$ is the perturbation power corresponding to the $k^{th}$ sampling; and
   the maximum power point tracking method further comprising step 7: repeating the steps 1 to 6, so as to enable the photovoltaic array to operate at the maximum power point.

3. The maximum power point tracking method of claim 2, prior to the step 1, further comprising: assigning initial values to the perturbation voltage step $\Delta U_k$ and the perturbation voltage step ratio r, wherein the initial value of the perturbation voltage step $\Delta U_k$ ranges from 1V to 3 V, and the initial value of the perturbation voltage step ratio r is 1.

4. The maximum power point tracking method of claim 3, wherein, when the inverter is started for the first time, the reference voltage for the DC bus of the inverter or the given signal for the voltage close loop control of the DC/DC converter in the inverter is set to a value that is 0.6-0.8 times a value of an open circuit voltage of the photovoltaic array.

5. The maximum power point tracking method of claim 4, wherein, when the inverter is started for the first time, the reference voltage for the DC bus of the inverter or the given signal for the voltage close loop control of the DC/DC converter in the inverter is set to a value that is 0.76 times a value of the open circuit voltage of the photovoltaic array, and the initial value of the perturbation voltage step $\Delta U_k$ is set to be 1 V.

6. The maximum power point tracking method of claim 2, wherein, in the steps 2 and 3, $U_{k-1}$, $U_k$, $I_{k-1}$, and $I_k$ are respectively mean-filtered in advance.

7. The maximum power point tracking method of claim 2, wherein, in the step 5, reliable voltage range for $\Delta U_{k+1}$ is 1-15 V; $\Delta U_{k+1}$ is limited to be 1 V when it is smaller than 1 V, and is limited to be 15 V when it is larger than 15 V.

8. The maximum power point tracking method of claim 2, wherein, in the step 7, if $\Delta P_k$ is determined to be smaller than a predetermined perturbation limitation for n times in succession, it is determined that the photovoltaic array operates at the maximum power point, and thus perturbation is stopped, wherein 4≤n≤6, and the perturbation limitation is 0.1% of rated power of the photovoltaic array.

9. A maximum power point tracking device, comprising a sampling unit, a calculating unit, a step ratio generating unit, a perturbation voltage step generating unit, and an outputting unit, wherein:
   the sampling unit is configured to sample a present voltage and a present current of a photovoltaic array;
   the calculating unit is configured to obtain a present power, a power for a previous sampling time, a present power difference which is a difference between the present power and the power for the previous sampling time, and a voltage difference between the present voltage and a voltage for the previous sampling time, based on the present voltage and the present current sampled by the sampling unit at a present sampling time, and the voltage for the previous sampling time and a current for the previous sampling time sampled at the previous sampling time;
   the step ratio generating unit is configured to use the present power difference obtained by the calculating unit as a present perturbation power, and to obtain a present gradient perturbation voltage step ratio based on a ratio of the present perturbation power to a perturbation power for the previous sampling time;
   the perturbation voltage step generating unit is configured to obtain a perturbation voltage step, based on the present gradient perturbation voltage step ratio obtained by the step ratio generating unit and the voltage difference between the present voltage and the voltage for the previous sampling time obtained by the calculating unit; and
   the outputting unit is configured to control an output voltage, based on the perturbation voltage step obtained by the perturbation voltage step generating unit.

10. The maximum power point tracking device of claim 9, further comprising an initial value assigning unit configured to assign an initial value to the perturbation voltage step of the photovoltaic array, and the initial value of the perturbation voltage step ranges from 1V to 3 V.

11. The maximum power point tracking device of claim 9, further comprising a mean filtering unit configured to perform mean filtering processing on sampled voltage values and current values.

12. The maximum power point tracking device of claim 9, further comprising an amplitude limiting unit configured to limit a reliable voltage range of the perturbation voltage step ($\Delta U_{k+1}$) to be within 1-15 V, wherein $\Delta U_{k+1}$ is limited to be 1 V when it is smaller than 1 V, and is limited to be 15 V when it is larger than 15 V.

13. A photovoltaic power generation system, comprising a photovoltaic array, and the maximum power point tracking device of claim 9.

14. The photovoltaic power generation system of claim 13, wherein the maximum power point tracking device further comprises an initial value assigning unit configured to assign an initial value to the perturbation voltage step of the photovoltaic array, and the initial value of the perturbation voltage step ranges from 1V to 3 V.

15. The photovoltaic power generation system of claim 13, wherein the maximum power point tracking device further comprises a mean filtering unit configured to perform mean filtering processing on sampled voltage values and current values.

16. The photovoltaic power generation system of claim 13, wherein the maximum power point tracking device further comprises an amplitude limiting unit configured to limit a reliable voltage range of the perturbation voltage step ($\Delta U_{k+1}$) to be within 1-15 V, wherein $\Delta U_{k+1}$ is limited to be 1 V when it is smaller than 1 V, and is limited to be 15 V when it is larger than 15 V.

17. The photovoltaic power generation system of claim 13, wherein the photovoltaic power generation system comprises a single-stage photovoltaic grid-connected inverter, and an output voltage of the maximum power point tracking device is a reference voltage for a DC bus of the inverter; or
   the photovoltaic power generation system comprises a double-stage photovoltaic grid-connected inverter, and the output voltage of the maximum power point tracking device is a given signal for a voltage close loop control of a DC/DC converter in the inverter.

18. The photovoltaic power generation system of claim 14, wherein the photovoltaic power generation system comprises a single-stage photovoltaic grid-connected inverter, and an output voltage of the maximum power point tracking device is a reference voltage for a DC bus of the inverter; or
   the photovoltaic power generation system comprises a double-stage photovoltaic grid-connected inverter, and the output voltage of the maximum power point tracking device is a given signal for a voltage close loop control of a DC/DC converter in the inverter.

19. The photovoltaic power generation system of claim 15, wherein the photovoltaic power generation system comprises a single-stage photovoltaic grid-connected inverter, and an output voltage of the maximum power point tracking device is a reference voltage for a DC bus of the inverter; or
   the photovoltaic power generation system comprises a double-stage photovoltaic grid-connected inverter, and the output voltage of the maximum power point tracking device is a given signal for a voltage close loop control of a DC/DC converter in the inverter.

20. The photovoltaic power generation system of claim 16, wherein the photovoltaic power generation system comprises a single-stage photovoltaic grid-connected inverter, and an output voltage of the maximum power point tracking device is a reference voltage for a DC bus of the inverter; or
   the photovoltaic power generation system comprises a double-stage photovoltaic grid-connected inverter, and an output voltage of the maximum power point tracking device is a given signal for a voltage close loop control of a DC/DC converter in the inverter.

* * * * *